United States Patent [19]
Barker et al.

[11] 4,306,057
[45] Dec. 15, 1981

[54] SOLVENT SWEEPING OF POLYCARBONATES

[75] Inventors: Henry P. Barker, Lock Haven, Pa.; Gary S. Motz, Wadesville; Donald L. Phipps, Mt. Vernon, both of Ind.; Phillip S. Wilson, Louisville, Ky.

[73] Assignee: General Electric Company, Pittsfield, Mass.

[21] Appl. No.: 54,480

[22] Filed: Jul. 3, 1979

Related U.S. Application Data

[63] Continuation of Ser. No. 890,476, Mar. 27, 1978, abandoned.

[51] Int. Cl.$^3$ ............................................. C08J 3/00
[52] U.S. Cl. ................................. 528/491; 528/494; 528/495
[58] Field of Search .................. 260/29.2 R, 33.4 R, 260/33.8 R; 528/1, 196, 370, 491, 495, 496

[56] References Cited

U.S. PATENT DOCUMENTS

| | | | |
|---|---|---|---|
| 3,186,961 | 6/1965 | Sears | 260/30.4 |
| 3,213,060 | 10/1965 | Jackson | 528/491 |
| 3,254,047 | 5/1966 | Caldwell | 260/33.8 R |
| 3,410,823 | 11/1968 | Cleveland | 260/47 |
| 3,505,273 | 4/1970 | Cleveland | 528/196 |
| 3,954,713 | 5/1976 | Schnoring | 528/196 |
| 4,013,702 | 3/1977 | Cartier | 528/196 |
| 4,038,252 | 7/1977 | Vernaleken | 260/47 |

*Primary Examiner*—Paul R. Michl
*Attorney, Agent, or Firm*—Morgan, Finnegan, Pine, Foley & Lee

[57] ABSTRACT

Novel thermoplastic molding compositions are disclosed which comprise a polycarbonate molding powder in admixture with a minor amount of a volatile matter entraining agent selected from the group consisting essentially of monochlorobenzene, a polyhydric material and solutions of a polyhydric material in water. A method of preparing a polycarbonate molding composition containing reduced amounts of volatile impurities is also disclosed.

29 Claims, No Drawings

SOLVENT SWEEPING OF POLYCARBONATES

CROSS-REFERENCE TO RELATED APPLICATION

This application is a continuation of application Ser. No. 890,476, filed Mar. 27, 1978, now abandoned.

This invention relates to thermoplastic molding compositions comprising a polycarbonate molding powder in admixture with minor amounts of a volatile matter entraining agent selected from the group consisting essentially of monochlorobenzene, a polyhydric material and solutions of a polyhydric material in water, which molding compositions have reduced amounts of volatile impurities. This invention also relates to a novel method of preparing polycarbonate molding compositions containing reduced amounts of volatile impurities.

BACKGROUND OF THE INVENTION

The use of polycarbonate resins as molding compositions is well known and these materials have been widely employed in the manufacture of thermoplastic molded articles.

In the normal course of the processing of polycarbonate powders to form suitable molding compositions, such powders are usually processed through an extrusion operation either alone or after being blended with other suitable components as may be necessary to satisfy the end use requirements of the molded article to be manufactured.

One particular problem which has faced the industry is the incorporation in the end product of minor amounts of residual volatile impurities which, if not removed during the preparation of the molding composition, can result in various defects in the end product, such as, for instance, blemishes, visual aberrations, or cloudiness in an otherwise clear manufactured article. In addition, the removal of the undesirable volatile impurities also serves to improve the anti-yellowing characteristics of finished products upon heat aging.

Various approaches have been discussed in the prior art to overcome the problem of the removal of residual amounts of volatile impurities from molding compositions with varying degrees of success.

Schnell et al. U.S. Pat. No. 3,267,075 disclose a process for the removal of such impurities via the injection of inert materials.

Skidmore U.S. Pat. No. 3,799,234 has suggested the countercurrent introduction of steam and/or other inert gaseous materials as a method of removing volatile compounds from a plastic material, particularly polyolefins, pointing out that the use of water is contraindicated for removing residual impurities from polycarbonates since water is not an inert material with respect to polycarbonates which contain chlorides.

It has now been found that the incorporation of a relatively small amount of a volatile matter entraining agent selected from the group consisting essentially of monochlorobenzene, a polyhydric material and solutions of a polyhydric material in water into the polycarbonate resin powder prior to, or during extrusion, acts as a sweeping agent and affects the removal of undesirable residual volatile impurities from the molding composition.

DESCRIPTION OF THE INVENTION

The present invention provides for novel thermoplastic molding compositions which comprise a polycarbonate molding powder in admixture with a minor amount of a volatile matter entraining agent selected from the group consisting essentially of monochlorobenzene, a polyhydric material and solutions of a polyhydric material in water. A method of preparing a polycarbonate molding composition containing reduced amounts of impurities is also disclosed.

The polycarbonate resin has recurring units of the formula

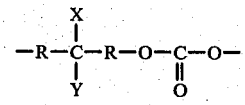

wherein each —R— is selected from the group consisting of phenylene, halo-substituted phenylene and alkyl substituted phenylene, and X and Y are each selected from the group consisting of hydrogen, hydrocarbon radicals free from aliphatic unsaturation and of radicals which together with the adjoining

atom form a cycloalkane radical, the total number of carbon atoms in X and Y being up to 12.

The preferred polycarbonate resins may be derived from the reaction of bisphenol-A and phosgene. These polycarbonates have from 100-400 recurring units of the formula:

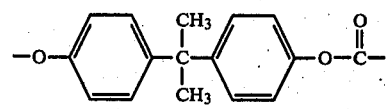

The polycarbonates are described in U.S. Pat. Nos. 3,028,365; 3,334,154 and 3,915,926 all of which are incorporated by reference. The polycarbonate should have an intrinsic viscosity between 0.2 and 1.0, preferably from 0.25 to 0.60 as measured at 20° C. in methylene chloride.

Reinforcing agents may be included and, if included, may be selected from finely divided aluminum, iron or nickel and the like, and non-metals, such as carbon filaments, silicates (such as acicular calcium silicate), asbestos, titanium dioxide, wollastonite, potassium titanate and titanate whiskers, glass flakes, fibers, and spheres.

Although it is only necessary to use a reinforcing amount of the reinforcing agent, from 1-60 parts by weight of the total weight of the composition may comprise the reinforcing agent. A preferred range is from 5-40 parts by weight.

The preferred reinforcing agents are of glass, and it is preferred to use fibrous glass filaments. The preferred filaments for plastics reinforcement are made by mechanical pulling. The filament diameters range from about 0.000112 to about 0.00075 inch, but this is not critical to the present invention.

Monochlorobenzene is a well-known chemical compound which is commercially available from a number of suppliers.

The compositions of the present invention may contain from about 0.1 to about 10 percent by weight of monochlorobenzene, prior to extrusion, and preferably will contain from about 0.1 to 5 percent by weight of monochlorobenzene. After extrusion the compositions will contain less than 0.1 percent by weight of monochlorobenzene.

The polyhydric materials which have been found to be useful in preparing the compositions of the present invention according to the method described are glycerine, ethylene glycol, 1,2-propanediol, 1,4-butanediol, poly(ethylene glycol) and poly(propylene glycol). These are all well-known materials which are commercially available from various sources.

Generally, when used alone, these polyhydric materials have been found to be useful in reducing the levels of residual volatile materials when employed in amounts from about 0.1 to about 5% by weight.

When employed in solution with water, such solutions will generally contain from about 5 to about 50% by volume of the polyhydric material and preferably from about 10 to about 25% by volume of such material. Such solutions of polyhydric materials in water are advantageously employed in the present invention in amounts from about 0.1 to about 10% by weight, prior to extrusion, and preferably in amounts from about 0.1 to about 5% by weight. After extrusion the compositions will contain less than 0.1% by weight of the polyhydric material.

The various volatile matter entraining agents which are the subject of the present invention may be advantageously systematically injected into the extrusion apparatus during the extruding operation, or alternatively added to the polycarbonate powder prior to extrusion.

The polycarbonate compositions of the present invention may be prepared by any standard procedure and the particular method employed is not critical.

The compositions may also include flame retardants such as those described in U.S. Pat. No. 3,915,926 which is incorporated herein by reference.

DESCRIPTION OF THE PREFERRED EMBODIMENTS

The following examples are set forth to further illustrate the present invention and are not to be construed as limiting the invention thereto.

EXAMPLE I—CONTROL 100 parts of LEXAN ®130-111 grade of polycarbonate molding powder, a commercially available product, was processed in a twin screw vacuum vented extruder and an analysis of the impurities which appeared in the extrudate was performed. The results of which are shown in Table I.

EXAMPLES II–V

Blends of LEXAN ®130-111 polycarbonate molding powder, a commercially available product, and an amount of monochlorobenzene as shown in Table I, were prepared and processed in a twin screw vacuum vented extruder as in Example I. The results of tests to determine the amount of impurities in the extrudate are shown in Table I.

TABLE I

|  | Example I - Control | Example II | Example III | Example IV | Example V |
|---|---|---|---|---|---|
| Polycarbonate (LEXAN ® 130-111) | 100 parts | same | same | same | same |
| Monochlorobenzene ($C_6H_5Cl$) (% by wt) | 0 | 0.5 | 1.0 | 2.0 | 4.0 |
| Analysis of Impurities (ppm) | | | | | |
| Methylene Chloride ($CH_2Cl_2$) | 289 | NDA | 30 | 25 | 40 |
| Carbon Tetrachloride ($CCl_4$) | 51 | NDA | NDA | NDA | NDA |
| Benzene ($C_6H_6$) | 27 | <5 | <5 | <5 | <5 |

NDA - No detectable amount

EXAMPLE VI—CONTROL 100 parts of a branched polycarbonate resin (IV=0.60 deciliters/gram in dioxane at 25° C.) was processed in the same manner as the polycarbonate used in Example I and tests performed to determine the amount of impurities present in the extrudate, the results of which are shown in Table II.

EXAMPLES VII–X

Blends of the branched polycarbonate used in Example VI with varying amounts of monochlorobenzene as shown in Table II were prepared and processed in the same manner as in Example I. The results of tests performed to determine the amount of impurities present in the extrudate is shown in the attached Table II.

TABLE II

|  | Example VI - Control | Example VII | Example VIII | Example IX | Example X |
|---|---|---|---|---|---|
| Polycarbonate | 100 parts | 100 parts | 100 parts | 100 parts | 100 parts |
| Monochlorobenzene ($C_6H_5Cl$) (% by wt) | 0 | 0.5 | 1.0 | 2.0 | 4.0 |
| Analysis of Impurities (ppm) | | | | | |
| Methylene Chloride ($CH_2Cl_2$) | 180 | NDA | NDA | NDA | NDA |
| Carbon Tetrachloride ($CCl_4$) | 40 | NDA | NDA | NDA | NDA |
| Benzene ($C_6H_6$) | 50 | NDA | NDA | NDA | NDA |

NDA - No detectable amount

EXAMPLE XI 100 parts of LEXAN ® 100 grade of polycarbonate molding powder was evaluated to determine the levels of impurities present. The results of the evaluation of this material are set forth in Table III.

EXAMPLES XII–XXVI

Various grades of commercially available LEX-AN ® polycarbonate molding powders were processed in an Egan three-stage single screw vacuum vented laboratory extruder operated at various vent pressures, both with and without the addition of various polyhydric materials as volatile matter entraining agents (sweeping agents). The results of the analyses of various physical parameters and of the impurities which appeared in the extrudate for each run are set forth in Table III.

TABLE III[1]

| EXAMPLE NO. | LEXAN® GRADE | ENTRAINING AGENT[2] TYPE | ENTRAINING AGENT[2] PERCENT(%) | VENT PRESSURE (mm Hg) | MELT INDEX KI | YELLOWNESS INDEX $YI_{600}$ | YELLOWNESS INDEX $YI_{680}$ | YELLOWNESS INDEX $\Delta YI$ | $CCl_4$ (ppm) | $CH_2Cl_2$ (ppm) | PHENOLICS (ppm) | FREE CHLORIDES (ppm) | IRON (ppm) | RESIDUAL ENTRAINING AGENT (ppm) | UV STABILIZER (%) | MELT STABILITY [GUTTFERT] (% Δ MV) |
|---|---|---|---|---|---|---|---|---|---|---|---|---|---|---|---|---|
| XI | 10% Powder | — | — | — | — | — | — | — | 6.1 | 50 (approx.) | 59 | <0.2 | 3.8 | — | .3[3] | — |
| XII (Control) | 101 | None | None | 760 | 4900 | 17.2 | 38.9 | 21.7 | — | — | — | — | — | — | — | — |
| XIII (Control) | 101 | None | None | 760 | 6220 | 4.3 | 8.4 | 4.1 | 4.6 | 1.0 | 101 | 6.5 | 2.5 | — | — | 5.2 |
| XIV | 101 | Glycerine | 0.69 | 5.0 | 4850 | 3.1 | 14.5 | 11.4 | 1.2 | 5.2 | 48 | 3.8 | — | 143 | — | — |
| XV | 101 | Glycerine | 1.10 | 2.0 | 4340 | 2.3 | 11.6 | 9.3 | 0.7 | 1.8 | 70 | 3.7 | — | 409 | — | — |
| XVI (Control) | 101 | None | None | 4.0 | 6610 | 3.4 | 6.7 | 3.3 | 1.5 | 0.1 | 60 | 2.8 | — | 540 | — | — |
| | | | | | | | | | 1.4 | 0.2 | 64 | 10.2 | 2.5 | <20 | — | — |
| XVII | 101 | 1,2-propanediol | 1.10 | 4.0 | 6500 | 1.9 | 4.7 | 2.8 | 1.8 | 0.3 | 60 | 9.2 | — | — | — | — |
| | | | | | | | | | 1.1 | 0.3 | 60 | 5.5 | — | 257 | — | 7.4 |
| XVIII | 101 | 1,2-propanediol | 1.52 | 0.8 | 6190 | 1.1 | 3.7 | 2.6 | 1.0 | 2.1 | 55 | 3.7 | — | 257 | — | — |
| | | | | | | | | | 0.4 | <0.1 | 61 | 1.8 | — | 304 | — | 8.8 |
| XIX (Control) | 101 | None | None | 760 | 6640 | 3.2 | 8.4 | 5.2 | 1.4 | <0.1 | 62 | 6.5 | 2.4 | 374 | — | 4.4 |
| XX (Control) | 101 | None | None | 6.0 | 6580 | 2.8 | 5.6 | 2.8 | 0.1 | <0.1 | 60 | 6.5 | — | — | — | 3.4 |
| XXI | 101 | 1,4-Butanediol | 1.05 | 6.0 | 6225 | 0.6 | 4.2 | 3.6 | 5.5 | 1.5 | 70 | 1.8 | — | — | — | — |
| | | | | | | | | | 3.5 | 0.3 | 54 | 1.8 | — | 137 | — | — |
| | | | | | | | | | 2.0 | 0.2 | 55 | 5.5 | — | | | |
| XXII (Control) | 103 | None | None | 760 | 6035 | 4.2 | 10.9 | 6.7 | 4.0 | 1.2 | 83 | 3.7 | — | 1.6 | .35 | 12.2 |
| XXIII (Control) | 103 | None | None | 8.0 | 5885 | 3.5 | 8.7 | 5.2 | 1.8 | 0.3 | 79 | 1.8 | 2.0 | <0.5 | .29 | 15.3 |
| XXIV | 103 | 1,4-Butanediol | 0.67 | 2.0 | 3610 | 2.3 | 7.1 | 4.8 | 0.4 | 0.1 | 68 | 3.7 | — | 98 | .21 | — |
| XXV | 103 | 1,2-propanediol | 1.57 | 0.7 | 5120 | 2.3 | 9.3 | 7.0 | 0.2 | <0.1 | 69 | 5.4 | — | 378 | .23 | — |
| | | | | | | | | | 0.4 | 0.3 | 84 | 1.8 | — | 549 | .27 | 23.5 |
| XXVI | 103 | Glycerine | 1.35 | 2.0 | 2920 | 3.9 | 22.8 | 18.9 | <0.05 | 0.2 | 87 | 5.4 | — | 604 | .25 | — |
| | | | | | | | | | 0.1 | 0.1 | 72 | 1.8 | 2.1 | 123 | .22 | — |

[1] Multiple values represent multiple samples from same run, e.g. start and finish.
[2] All entraining agents were 16.7% by volume polyhydric alcohol in water, expressed as a weight percentage of polymer extruded.
[3] Added to powder for runs XXII through XXVI only.

We claim:

1. A process for preparing an extrusion molded polycarbonate product which comprises
   (a) adding to a polycarbonate molding powder a minor amount of a volatile matter entraining agent selected from the group consisting essentially of monochlorobenzene, a polyhydric material and solutions of a polyhydric material in water;
   (b) subjecting the molding composition, including the volatile matter entraining agent, to an extrusion molding operation;
   (c) removing the volatilized entraining agent and impurities which are evolved during the molding operation; and
   (d) obtaining a molded product which is substantially free from volatile impurities.

2. A process for preparing an extrusion molded polycarbonate product which is substantially free from volatile impurities according to claim 1 wherein the volatile matter entraining agent is added prior to the extrusion thereof.

3. A process for preparing an extrusion molded polycarbonate product which is substantially free from volatile impurities according to claim 1 wherein the volatile matter entraining agent is added during the extrusion operation.

4. A process for preparing an extrusion molded polycarbonate product which is substantially free from volatile impurities according to claim 1 wherein the volatile matter entraining agent is monochlorobenzene.

5. A process for preparing an extrusion molded polycarbonate product which is substantially free from volatile impurities according to claim 1 wherein the volatile matter entraining agent is a polyhydric material.

6. A process for preparing an extrusion molded polycarbonate product which is substantially free from volatile impurities according to claim 1 wherein the volatile matter entraining agent is a solution of a polyhydric material in water.

7. A process for preparing an extrusion molded polycarbonate product which is substantially free from volatile impurities according to claim 1 wherein the volatile matter entraining agent is glycerine.

8. A process for preparing an extrusion molded polycarbonate product which is substantially free from volatile impurities according to claim 1 wherein the volatile matter entraining agent is ethylene glycol.

9. A process for preparing an extrusion molded polycarbonate product which is substantially free from volatile impurities according to claim 1 wherein the volatile matter entraining agent is 1,2-propanediol.

10. A process for preparing an extrusion molded polycarbonate product which is substantially free from volatile impurities according to claim 1 wherein the volatile matter entraining agent is 1,4-butanediol.

11. A process for preparing an extrusion molded polycarbonate product which is substantially free from volatile impurities according to claim 1 wherein the volatile matter entraining agent is poly(ethylene glycol).

12. A process for preparing an extrusion molded polycarbonate product which is substantially free from volatile impurities according to claim 1 wherein the volatile matter entraining agent is poly(propylene glycol).

13. A process for preparing an extrusion molded polycarbonate product which is substantially free from volatile impurities according to claim 1 wherein the volatile matter entraining agent is a solution of glycerine in water.

14. A process for preparing an extrusion molded polycarbonate product which is substantially free from volatile impurities according to claim 1 wherein the volatile matter entraining agent is a solution of ethylene glycol in water.

15. A process for preparing an extrusion molded polycarbonate product which is substantially free from volatile impurities according to claim 1 wherein the volatile matter entraining agent is a solution of 1,2-propanediol in water.

16. A process for preparing an extrusion molded polycarbonate product which is substantially free from volatile impurities according to claim 1 wherein the volatile matter entraining agent is a solution of 1,4-butanediol in water.

17. A process for preparing an extrusion molded polycarbonate product which is substantially free from volatile impurities according to claim 1 wherein the volatile matter entraining agent is a solution of poly(ethylene glycol) in water.

18. A process for preparing an extrusion molded polycarbonate product which is substantially free from volatile impurities according to claim 1 wherein the volatile matter entraining agent is a solution of poly(propylene glycol) in water.

19. A process for preparing an extrusion molded polycarbonate product which is substantially free from volatile impurities according to claim 1 wherein the volatile matter entraining agent is added in an amount from about 0.1 to about 10% by weight.

20. A process for preparing an extrusion molded polycarbonate product which is substantially free from volatile impurities according to claim 1 wherein the volatile matter entraining agent is added in an amount from about 0.1 to about 5% by weight.

21. A process for preparing an extrusion molded polycarbonate product which is substantially free from volatile impurities according to claim 1 wherein the polycarbonate has recurring units of the formula

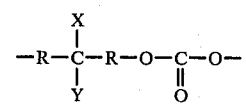

wherein each —R— is selected from the group consisting of phenylene, halo-substituted phenylene and alkyl substituted phenylene, and X and Y are each selected from the group consisting of hydrogen, hydrocarbon radicals free from aliphatic unsaturation and of radicals which together with the adjoining atom form a cycloalkane radical, the total number of carbon atoms in X and Y being up to 12.

22. A process according to claim 21 wherein the polycarbonate has the repeating unit

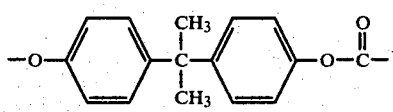

23. A process according to claim 22 wherein the polycarbonate resins consist of from 100 to 400 repeating units.

24. A process for preparing an extrusion molded polycarbonate product which is substantially free from volatile impurities which comprises adding to a polycarbonate molding powder 1,2-propanediol in an amount from about 0.1 to about 5% by weight prior to the extrusion thereof.

25. A process for preparing an extrusion molded polycarbonate product which is substantially free from volatile impurities which comprises adding to a polycarbonate molding composition 1,2-propanediol in an amount from about 0.1 to about 5% by weight during the extrusion thereof.

26. A process for preparing an extrusion molded polycarbonate product which is substantially free from volatile impurities which comprises adding to a polycarbonate molding powder a solution of 1,2-propanediol in water in an amount from about 0.1 to about 5% by weight prior to the extrusion thereof.

27. A process for preparing an extrusion molded polycarbonate product which is substantially free from volatile impurities which comprises adding to a polycarbonate molding composition a solution of 1,2-propanediol in water in an amount from about 0.1 to about 5% by weight during the extrusion thereof.

28. A process for preparing an extrusion molded polycarbonate product according to claim 26 wherein the solution is a 16% solution of 1,2-propanediol in water.

29. A process for preparing an extrusion molded polycarbonate product according to claim 27 wherein the solution is a 16% solution of 1,2-propanediol in water.

* * * * *